US008345593B2

(12) United States Patent
Weniger et al.

(10) Patent No.: US 8,345,593 B2
(45) Date of Patent: Jan. 1, 2013

(54) DYNAMIC DISCOVERY OF HOME AGENT WITH SPECIFIC BINDING

(75) Inventors: Kilian Weniger, Langen (DE); Jens Bachmann, Langen (DE)

(73) Assignee: Panasonic Corporation, Osaka (JP)

(*) Notice: Subject to any disclaimer, the term of this patent is extended or adjusted under 35 U.S.C. 154(b) by 1224 days.

(21) Appl. No.: 12/090,854

(22) PCT Filed: Oct. 10, 2006

(86) PCT No.: PCT/EP2006/009779
§ 371 (c)(1),
(2), (4) Date: Jun. 26, 2008

(87) PCT Pub. No.: WO2007/045379
PCT Pub. Date: Apr. 26, 2007

(65) Prior Publication Data
US 2008/0291867 A1    Nov. 27, 2008

(30) Foreign Application Priority Data
Oct. 21, 2005  (EP) ..................................... 05023053

(51) Int. Cl.
*H04W 4/00*    (2009.01)
(52) U.S. Cl. ........................................................ 370/328
(58) Field of Classification Search .................... 370/328
See application file for complete search history.

(56) References Cited

U.S. PATENT DOCUMENTS

| | | | | |
|---|---|---|---|---|
| 5,719,562 A | * | 2/1998 | Fawcett | ........................ 340/7.45 |
| 7,227,863 B1 | * | 6/2007 | Leung et al. | .................. 370/390 |
| 7,489,667 B2 | * | 2/2009 | Faccin et al. | ................... 370/338 |
| 7,561,553 B2 | * | 7/2009 | Venkitaraman et al. | ....... 370/338 |
| 7,778,229 B2 | * | 8/2010 | Denny et al. | ................... 370/338 |
| 7,805,605 B2 | * | 9/2010 | Takeda et al. | ................. 713/156 |
| 2003/0095523 A1 | * | 5/2003 | Korus et al. | .................... 370/338 |
| 2003/0182433 A1 | | 9/2003 | Kulkarni | |
| 2004/0063402 A1 | | 4/2004 | Takeda | |
| 2004/0114558 A1 | | 6/2004 | Krhishamurthi | |
| 2004/0139148 A1 | * | 7/2004 | Norton et al. | ................. 709/200 |
| 2006/0034209 A1 | * | 2/2006 | O'Neill | .......................... 370/328 |
| 2006/0089161 A1 | * | 4/2006 | Kim et al. | ...................... 455/458 |
| 2009/0144809 A1 | * | 6/2009 | Dommety et al. | ................ 726/4 |
| 2009/0300770 A1 | * | 12/2009 | Rowney et al. | .................. 726/26 |
| 2010/0211967 A1 | * | 8/2010 | Ramaswamy et al. | .......... 725/14 |

OTHER PUBLICATIONS

International Search Report dated Jan. 22, 2007.
Johnson et al., "Mobility Support in IPv6," IETF RFC 3775, Jun. 2004, pp. 1-155.

* cited by examiner

*Primary Examiner* — Derrick Ferris
*Assistant Examiner* — Saad A Waqas
(74) *Attorney, Agent, or Firm* — Seed IP Law Group PLLC

(57) ABSTRACT

The invention relates to a method for obtaining a home node address in a packet switched network comprising nodes. The method comprises the steps of a first node sending to a first home node of a home network a request containing information about a home address of a mobile node to determine whether a binding with said home address indicating a registration of said mobile node at the first home node exists; the first home node receiving the request, said first home node comprising a stored binding table; determining whether the binding with said home address exists in any home node of the home network; and if the home address of the mobile node is in the binding table of any of the home nodes in the home network, the first node receiving a reply comprising the address of the home node with said binding.

22 Claims, 8 Drawing Sheets

DYNAMIC DISCOVERY OF HOME AGENT WITH SPECIFIC BINDING

BACKGROUND OF THE INVENTION

1. Field of the Invention

The invention is related to packet-switched mobile communications systems. More specifically it relates to determining a Home Agent with Specific Binding in mobile communication based on the Mobile Internet Protocol (Mobile IP) or similar protocols.

2. Prior Art

The invention is described for the example of the Mobile Internet Protocol version 6 (Mobile IPv6). It is, however, also applicable to other protocols defining equivalent entities corresponding to the described entities of the Mobile IP.

To implement Mobile IPv6, you need a Home Agent on the home subnet on which the Mobile Node's home address resides. The IPv6 home address (HoA) is assigned to the Mobile Node. The Mobile Node obtains a new IPv6 address (the CoA) on networks to which it connects. The Home Agent accepts binding updates from the Mobile Node informing the Home Agent of the Mobile Node's location. The Home Agent then acts as proxy for the Mobile Node, intercepting traffic to the Mobile Node's home address and tunneling it to the Mobile Node.

The Home Agent is one of three key components in Mobile IPv6. The Home Agent works with the Correspondent Node and Mobile Node to enable Mobile IPv6 functionality. The Home Agent maintains an association between the Mobile Node's home IP or IPv6 address and its CoA (loaned address) on the foreign network. The Correspondent Node is the destination IP or IPv6 host in session with a Mobile Node. The Mobile Node is an IP or IPv6 host that maintains network connectivity using its home IP or IPv6 address, regardless of the link (or network) to which it is connected.

A separate binding cache is maintained by each Home Agent and optionally by a Correspondent Node for each of its IPv6 addresses. When the router sends a packet, it searches the binding cache for an IPv6 address before it searches the neighbor discovery conceptual destination cache. The binding cache for any one of a node's IPv6 addresses may contain one entry for each Mobile Node home address. The contents of all of a node's binding cache entries are cleared when it reboots. Binding cache entries are marked either as home registration or correspondent registration entries, depending on whether it is stored in a Home Agent or a Correspondent Node. A home registration entry is deleted when its binding lifetime expires; other entries may be replaced at any time through a local cache replacement policy.

If a Mobile Node (MN) moves between subnets, it must change its IP address to a topologically correct one. The reason is the hierarchical routing structure of the Internet, i.e., the IP addresses do not only serve identification purposes, but also contain location information. However, since connections on higher layers such as TCP (Transport Layer Protocol) connections are defined with the IP addresses (and ports) of the communicating nodes, the connection breaks if one of the nodes changes its IP address due to movement.

Mobile IPv6 [D. Johnson, C. Perkins, J. Arkko, "Mobility Support in IPv6", IETF RFC 3775, June 2004] is a layer 3 mobility protocol that enables MNs to move between subnets in a transparent manner for higher layers, i.e. without breaking higher-layer connections. Therefore, an MN uses two IP addresses: a Care-of-Address (CoA) and a Home Address (HoA). The MN's higher layers use the HoA for communication with the Correspondent Node (CN). This address does not change and serves the purpose of identification of the MN. Topologically, it belongs to the home network of the MN. In contrast, the CoA changes on every movement resulting in a subnet change and is used as the locator for the routing infrastructure. Topologically, it belongs to the network the MN is currently visiting. One out of multiple Home Agents (HA) located on the home link maintains a mapping of the MN's CoA to the MN's HoA and redirects incoming traffic for the MN to its current location.

Reasons for having multiple HAs on the home link instead of a single HA are redundancy and load balancing. When bootstrapping in a foreign network, a mobile node needs to know the IP address of one of the HAs in order to be able to register with this HA. Since an HA might not always be reachable, e.g., because it has crashed or because the administrator updates hardware or software, an MN shall be able to dynamically discover an HA address. Multiple methods exist to solve this problem.

Included in IPv6 is a new addressing method called "anycasting" in addition to unicasting and multicasting known from IPv4. Unicast is a communication between a single host and a single receiver. Packets sent to a unicast address are delivered to the interface identified by that address, multicast is communication between a single host and multiple receivers. Packets are sent to all interfaces identified by that address and packets sent to an anycast address are delivered to the any (usually the nearest) interface identified by that address, anycast is a communication between a single sender and any out of multiple receivers.

The Dynamic Home Agent Address Discovery (DHAAD) [D. Johnson, C. Perkins, J. Arkko, "Mobility Support in IPv6", IETF RFC 3775, June 2004] uses anycasting to discover an HA address. Anycast routing means that packets are delivered to one out of a group of destinations. The actual receiver can be the one that is closest to the sender or, if all destinations are at the same distance (as in the DHAAD case), the actual receiver can be any one of the destinations, i.e., it is randomly selected.

An MN constructs an anycast address by concatenating the prefix of its home network with a well-known interface identifier. It sends an ICMP (Internet Control Message Protocol) DHAAD Request message to this anycast address. Besides type and code field, this message contains a checksum and an identifier field (see FIG. 1). The latter is required to enable the sender of the request to match the reply to this request. Any one of the HAs on the link receives this anycast message and replies with an ICMP DHAAD Reply message, which contains (besides type, code and checksum field) a list of addresses of HAs on the local link (see FIG. 2). Every HA knows the addresses of all other HAs on the local link from received Router Advertisement messages. Those messages contain the information whether the sender is a router only or can additionally serve as HA. Based on the received list of HA addresses in the DHAAD reply, the MN hence can select one of the addresses and use this as destination address for home registration messages.

Two alternative mechanisms for HA address discovery based on (Domain Name System (DNS) are presented in "Mobile IPv6 bootstrapping in split scenario" [G. Giaretta, K. Kempf, V. Devarapalli, draft-ietf-mip6-bootstrapping-split-00.txt, June 2005]. In one method, the MN requests the address belonging to a well-known HA Fully Qualified Domain Name (FQDN) from the Domain Name System, such as ha1.example.com". The network operator can perform load balancing by changing the corresponding DNS entry.

In another method, the MN asks the DNS for a HA service and the DNS returns multiple FQDNs, each with weight and preference values set by the operator. Those entries are DNS SRV resource records [A. Gulbrandsen, P. Vixie, L. Esibov, "A DNS RR for specifying the location of services (DNS SRV)", RFC 2783]. The MN can then select an FQDN based on those values and can request the corresponding IP address from DNS in a subsequent DNS request.

Some infrastructure-based route optimizations protocols like the ones described in "Route Optimization and Location Privacy using Tunneling Agents (ROTA)" [K. Weniger, T. Aramaki, IETF I-D draft-weniger-rota-00.txt, July 2005] and "Providing End-to-End Location Privacy in IP-based Mobile Communication" [WO2004055993] [G. Krishnamurthi, H. Chaskar, R. Siren, IEEE WCNC, March 2004] require the setup of tunnels to/from network infrastructure entities to achieve an end-to-end tunnel between MN and CN, which provides a shorter route. For instance, the usual data path in bi-directional tunnelling mode between two MNs is MN1-MN1's HA-MN2's HA-MN2 (see FIG. 3). Hence, route optimization can be achieved with two concatenated tunnel segments MN1-MN2's HA and MN2's HA-MN2 (see FIG. 4). In case multiple HAs per link exist in this scenario, MN1 has to discover the very HA that is the tunnel endpoint of MN2, i.e., that manages the binding for MN2. Since DHAAD and the DNS-based solution both can only discover any HA address, they cannot be used to solve this problem.

In US2004063402 a method is described for load balancing between HAs using the DHAAD method. Since the HA addresses are selected independently of their binding caches, the proposed method does not solve the given problem either.

In WO2004055993 and "Providing End-to-End Location Privacy in IP-based Mobile Communication" [G. Krishnamurthi, H. Chaskar, R. Siren, IEEE WCNC, March 2004] the problem is solved by sending a unicast request to MN2. Since the only HA in MN2's home network that is on the data path to MN2 is MN2's HA, it can intercept this request message and send a reply. The main drawback of this method is that HAs have to process every data packet in order to check whether the packet contains a request message, even if the packet is not addressed to one of the Home Agent's IP addresses. This can significantly slow down packet forwarding.

The problem to be solved is to discover the IP address of the HA managing a specific binding without requiring HAs to process packets that are not addressed to one of their IP addresses.

SUMMARY OF THE INVENTION

It is an object of the invention to discover the HA with a specific binding by extending the DHAAD method described in "Mobility Support in IPv6" [D. Johnson, C. Perkins, J. Arkko, IETF RFC 3775, June 2004].

The object is solved by the subject matter of the independent claims. Advantageous embodiments of the invention are subject matters to the dependent claims.

To achieve this object, the present invention provides a method, system, apparatus and computer-readable medium for obtaining a home node address in a packet switched network comprising nodes. The method comprises the steps of a first node sending to a first home node of a home network a request containing information about a home address of a mobile node to determine whether a binding with said home address indicating a registration of said mobile node at the first home node exists; the first home node receiving the request, said first home node comprising a stored binding table; determining whether the binding with said home address exists in any home node of the home network; and if the home address of the mobile node is in the binding table of any of the home nodes in the home network, the first node receiving a reply comprising the address of the home node with said binding.

According to an advantageous embodiment the registration is a Mobile IP, SIP, HIP or mobike registration.

According to another embodiment the first home node is a Mobile IP home agent or a SIP server or a HIP rendezvous server or mobike server or a mobility anchor point or a mobile router.

In a further embodiment the first node is a Mobile IP home agent or a SIP server or a HIP rendezvous server or a mobike server or a mobility anchor point or an access router.

An advantageous aspect of the invention is, that the first node is a mobile node or a Mobile IP home agent or a SIP server or a HIP rendezvous server or a mobike server or a mobility anchor point or an access router.

In another embodiment of the invention the third step comprises searching the binding table of the first home node for the home address of the mobile node.

According to another embodiment of the invention the first step uses an unicast address as destination address.

In a further embodiment of the invention multiple requests are sent to different home nodes using different unicast addresses and multiple replies are sent by different home nodes.

An advantageous aspect of the invention is that said unicast addresses are determined by a prior request and reply exchange or by a DNS request and reply exchange.

According to another advantageous embodiment the unicast address of the first home node is determined by a mapping function between the home address of the mobile node and the first home node address.

In another advantageous embodiment the first step uses an anycast address as destination address; all home nodes being configured with the anycast address.

According to an advantageous embodiment the first step uses a multicast address as destination address; all home nodes are configured with the multicast address.

Another embodiment of the invention further comprises the steps of: searching by the first home node in its binding table and in an additional pre-established backup binding table for the home address of the mobile node, with the backup binding table containing bindings stored in other home nodes belonging to the same home network as the first home node; and sending by the first home node to the first node a reply comprising the address of a second home node with the specific binding.

According to another advantageous embodiment of the invention it further comprises the step of forwarding the first node's request to other home nodes in the home network if the home address of the mobile node has not been found in the binding table of the first home node. It is an advantage that this step uses broadcast, unicast or multicast.

Another embodiment of the invention further comprises the steps of: receiving by a second home node the forwarded request; searching by the second home node in its binding table for the home address of the mobile node; and sending by the second home node a reply directly to the first node.

In a further advantageous embodiment the steps of: receiving by a second home node the forwarded request; searching by the second home node in its stored binding table for the home address of the mobile node; and sending by the second home node a reply to the first home node are comprised.

Another embodiment further comprises the steps of receiving by the first home node the reply from the second home node; sending by the first home node to the first node a reply comprising an indication that the specific binding exists in the binding table of the second home node.

In another embodiment of the invention the request and/or reply messages are Mobile IP Home Agent Address Discovery requests and/or reply messages.

An advantageous aspect of the invention is that the address of the home node storing the specific binding is communicated to the first node by a source address field in an IP header of the Home Agent Address Discovery reply, if the sender of the reply is storing the specific binding, and a new flag in a reserved field of the Home Agent Address Discovery reply message is added for indication thereof.

According to another advantageous embodiment the address of the home node storing the specific binding is communicated to the mobile node by adding it to the binding list in the Home Agent Address Discovery reply message and adding a new flag to a reserved field in the Home Agent Address Discovery reply message for indication thereof.

In a further embodiment the request of the first step contains the home address or a compressed value of the home address.

In another advantageous embodiment the home address of the mobile node is compressed by applying a hash function.

According to a further embodiment the compressed home address is transported in the identifier field of the Home Agent Address Discovery request message.

In a further advantageous embodiment of the invention the home address of the mobile node is concatenated with an address of the first node before being compressed to ensure uniqueness of the identifier of requests if the same binding is requested by different nodes.

An advantageous embodiment of the invention is that the first home node searches the binding table for the specific binding by, for each binding table entry, applying the hash function to the home address in the entry or to the concatenation of the home address in the entry and the source address of the request message and comparing the resulting hash value with the identifier field in the request message.

According to a further advantageous embodiment the first node concludes that a hash collision exists if multiple replies indicating different home node addresses or one reply containing multiple different home node addresses are received. In another advantageous embodiment the first node and first home node have a pre-configured ordered list of hash functions which are used to compress the home address of the mobile node in subsequent request/reply messages in order to resolve the hash collision.

It is a further advantage that the hash function is a keyed hash function and the ordered list contains different keys.

Another advantageous embodiment of the present invention is that a hash function index field or hash key index field in the reserved field of the Home Agent Address Discovery request header indicates a specific hash function or hash key used.

According to a further advantageous embodiment of the invention the hash collision is resolved by including the home address of the binding found in the binding table in the reply message.

A further advantageous embodiment of the invention relates to a system for obtaining a home node address in a packet switched network comprising nodes. The system comprises: a first node adapted to send to a first home node of a home network a request containing information about a home address of a mobile node to determine whether a binding with said home address indicating a registration of said mobile node at the first home node exists; the first home node being adapted to receive the request and comprising a stored binding table; the first home node further being adapted to search in the binding table for a home address of the mobile node; and the first node further being adapted to receive a reply comprising the home node address with said binding, if the home address of the mobile node is in the binding table of any of the home nodes in the home network.

According to another advantageous embodiment the invention relates to a home node in a packet switched network comprising nodes, the home node comprising a stored binding table and being adapted to receive a request from a first node and search in the binding table for a home address of a mobile node.

Another aspect of the invention relates to a node in a packet switched network comprising nodes adapted to: send to a first home node of a home network a request containing information about a home address of a mobile node to determine whether a binding with said home address indicating a registration of said mobile node at the first home node exists; and receive a reply comprising the home node address with aid binding, if the home address of the mobile node is in the binding table of any of the home nodes in the home network.

In a further advantageous embodiment of the invention a computer readable medium is concerned storing instructions that, when executed by a processor of a home node in a packet switched network comprising nodes, the home node comprising a stored binding table, cause the node to: receive a request from a first node; and search in the binding table for a home address of a mobile node.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION

The illustrative embodiments of the present invention will be described with reference to the figure drawings, wherein like elements and structures are indicated by like references.

This invention describes a method for Mobile IPv6-based mobile communications systems that enables the discovery of the address of an Home Agent that manages a specific binding. Such functionality is needed by some infrastructure-based route optimization methods. Previous solutions have the drawback that Home Agents have to process every forwarded data packet and, hence, forwarding might be slowed down in Home Agents. This invention solves the problem without having this drawback. This is achieved by a combination of either proactive or reactive binding cache synchronization and an extended DHAAD Request and Reply message exchange.

Also DHAAD messages are ICMP messages without option field and as such they cannot easily be extended. Hence, a method is proposed to exploit an existing field for transmitting the necessary information in a compressed form, while still preserving the original purpose of this field. Ambiguities resulting from the compression are handled specifically.

Figure 1:
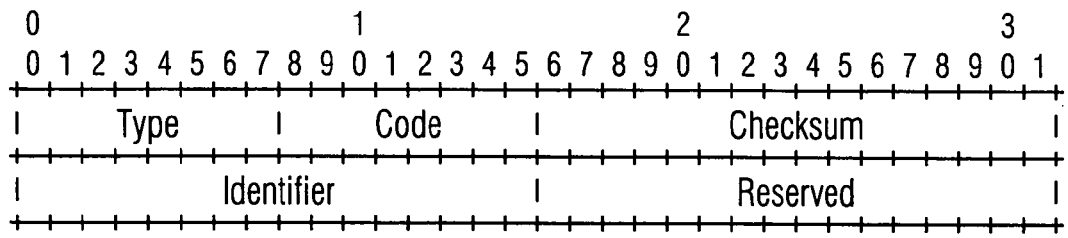
FIG. 1 shows a DHAAD Request message (taken from RFC3775)
Figure 2:
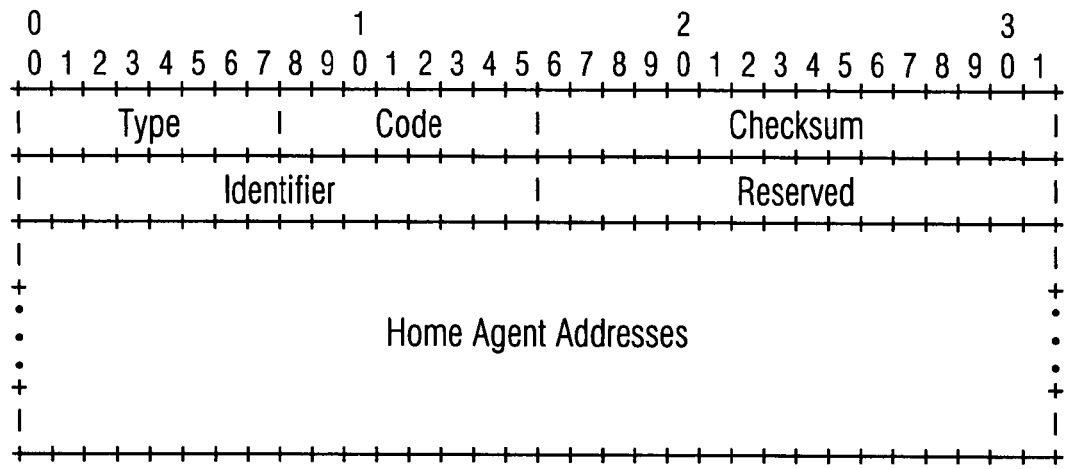
FIG. 2 shows a DHAAD Reply message (taken from RFC3775)
Figure 3:
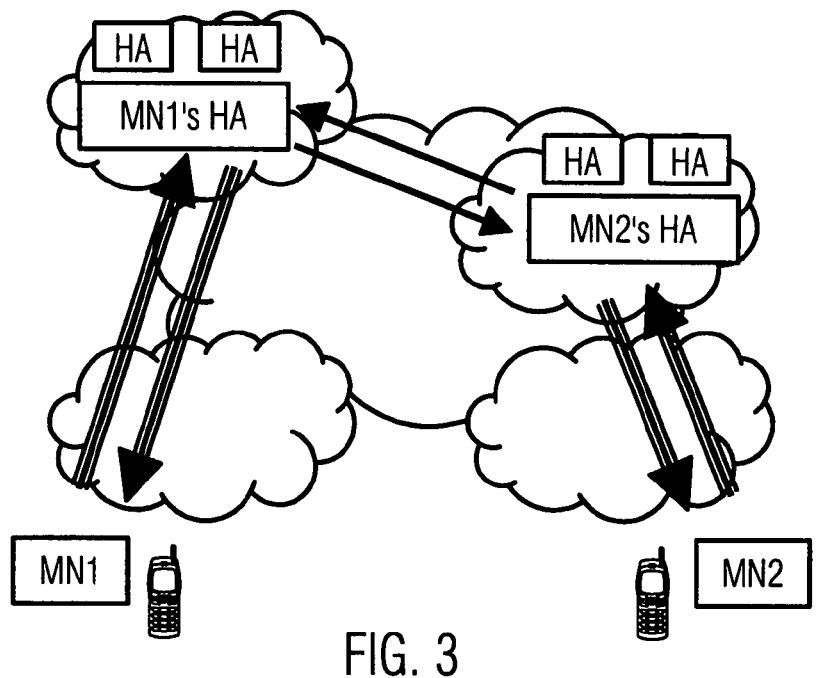
FIG. 3 shows a bi-directional tunneling path between two Mobile Nodes.
Figure 4:
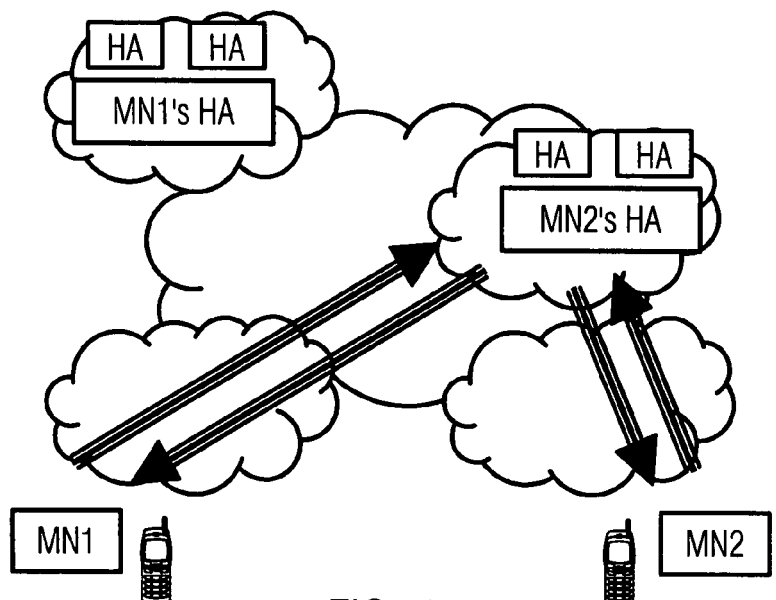
FIG. 4 shows route optimization with two concatenated tunnel segments.

The main goal is to discover the HA with a specific binding without requiring the HAs to process every data packet not addressed to one of their IP addresses. Therefore, the DHAAD method described in "Mobility Support in IPv6" [D. Johnson, C. Perkins, J. Arkko, IETF RFC 3775, June 2004] is extended. Instead of sending a DHAAD request message, the initiator sends a "DHAAD-Specific Binding (SB)" request message, which additionally contains the HoA of the specific binding. In the example shown in FIG. 3 and FIG. 4, the initiator would be MN1 and the HoA of the specific binding would be MN2's HoA. If an HA address has already been discovered using either the anycast-based or the DNS-based procedure described in the background section, the DHAAD-SB request can be sent directly to the corresponding unicast address. Otherwise, the request is sent to the anycast address belonging to the prefix of HoA of the specific binding.

The HA receives the DHAAD-SB request message and searches its binding cache for MN2's HoA. If it has a corresponding binding cache entry, it can directly reply with a DHAAD-SB reply message. In comparison to the DHAAD message, this message has an additional "SB list flag" indicating that the HA list only contains the address of the HA that has a corresponding binding cache entry. Alternatively, a new "SB source address flag" can be introduced in the message, which indicates to the receiver that the IP source address of the reply message is the address of the HA managing the sought-after binding. In this case, the HA list can either be empty or can contain the addresses of all HAs on the link.

If the HA receiving the DHAAD-SB request does not find the HoA of the specific binding in its binding cache, in one embodiment of this invention the HA forwards the request to all other HAs on the link. This can be done by broadcast, unicast or multicast. If the home link is distributed in the Internet such as in GlobalHAHA [P. Thubert, R. Wakikawa, V. Devarapalli, "Global HA to HA protocol", IETF Internet Draft draft-thubert-nemo-global-haha-00, October 2004], broadcasting is not possible and unicast or multicast must be used. A HA receiving this forwarded request searches the HoA of the specific binding in its binding cache. If it finds a matching entry, it either replies directly to the initiator or
sends the reply to the HA that forwarded the request.

Figure 5:
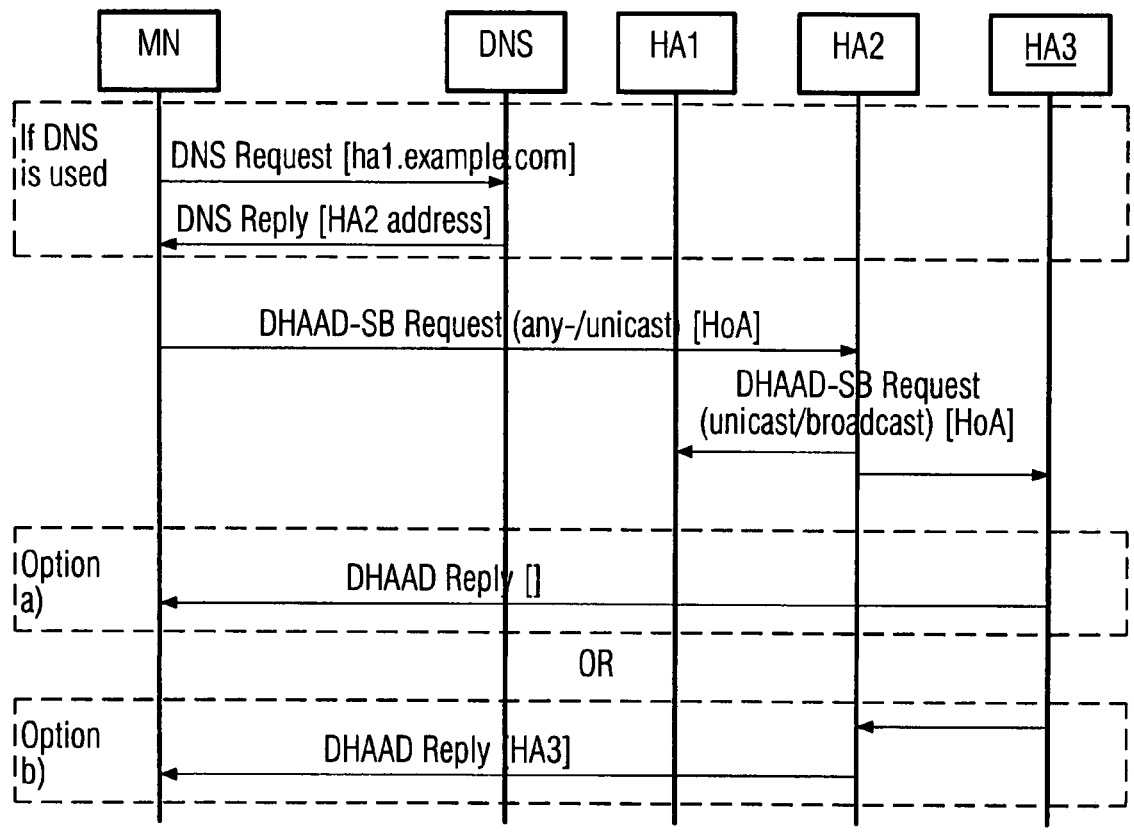
FIG. 5 is an example of DHAAD-SB signaling flow in case of reactive binding cache synchronization.

In the former case, the "SB source address flag" can be used and the HA list may be empty. In the latter case, the HA that initially has received the request collects the replies from all HAs on the link (in case multiple HAs have replied) and sends one aggregated reply message with the "SB list flag" set back to the initiator. This message contains the list of the addresses of all HAs having the corresponding binding. FIG. 5 shows an exemplary signalling flow with three HAs on the home link. HA3 is underlined in this figure because it is the HA with the specific binding.

Figure 6:
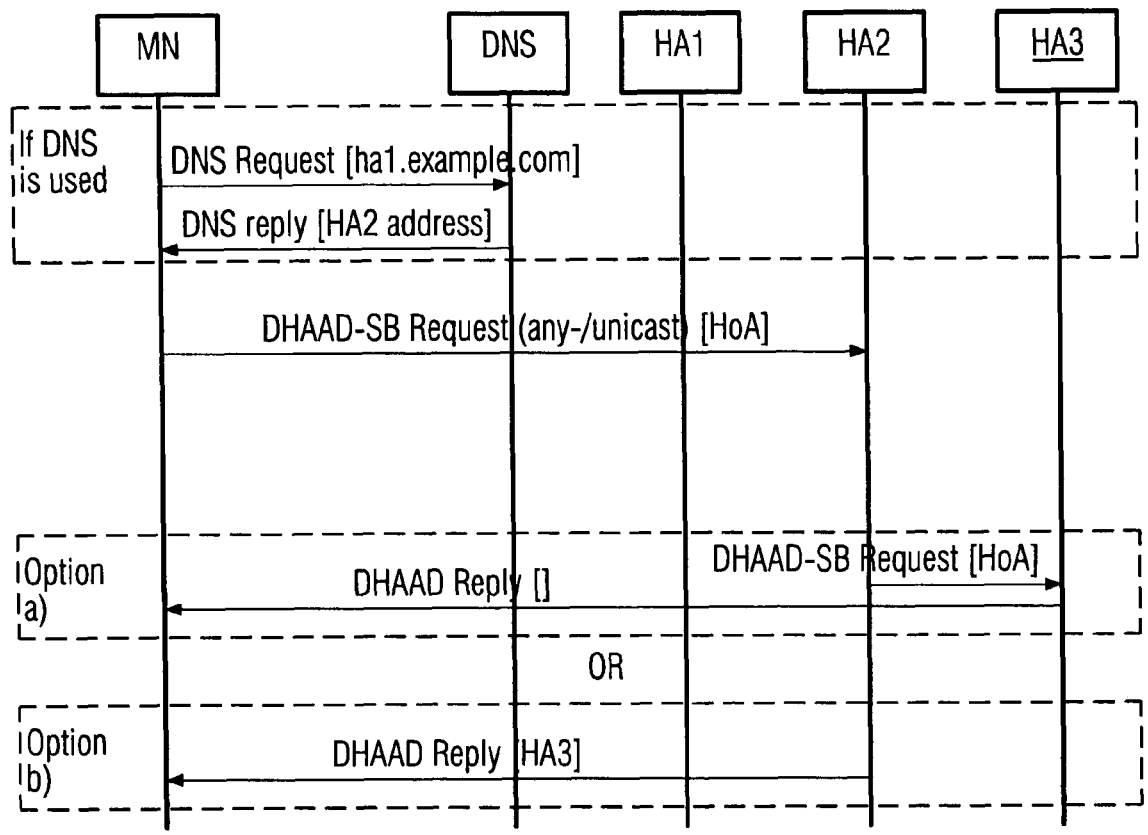
FIG. 6 is an example of DHAAD-SB signaling flow in case of proactive binding cache synchronization.

In an alternative embodiment, all HAs on the home link proactively synchronize their binding caches. This is not specified in RFC3775, but may have advantages in terms of reliability, since every HA is able to take over a binding if one HA crashes. In this case, the HAs may have another "backup binding cache" besides their "primary binding cache" as specified in RFC3775. After receiving the DHAAD-SB request sent by the initiator, the HA does not need to forward the request, but can look up its primary and backup binding caches and directly reply with the list of HA addresses with specific binding (see FIG. 6).

Figure 12:
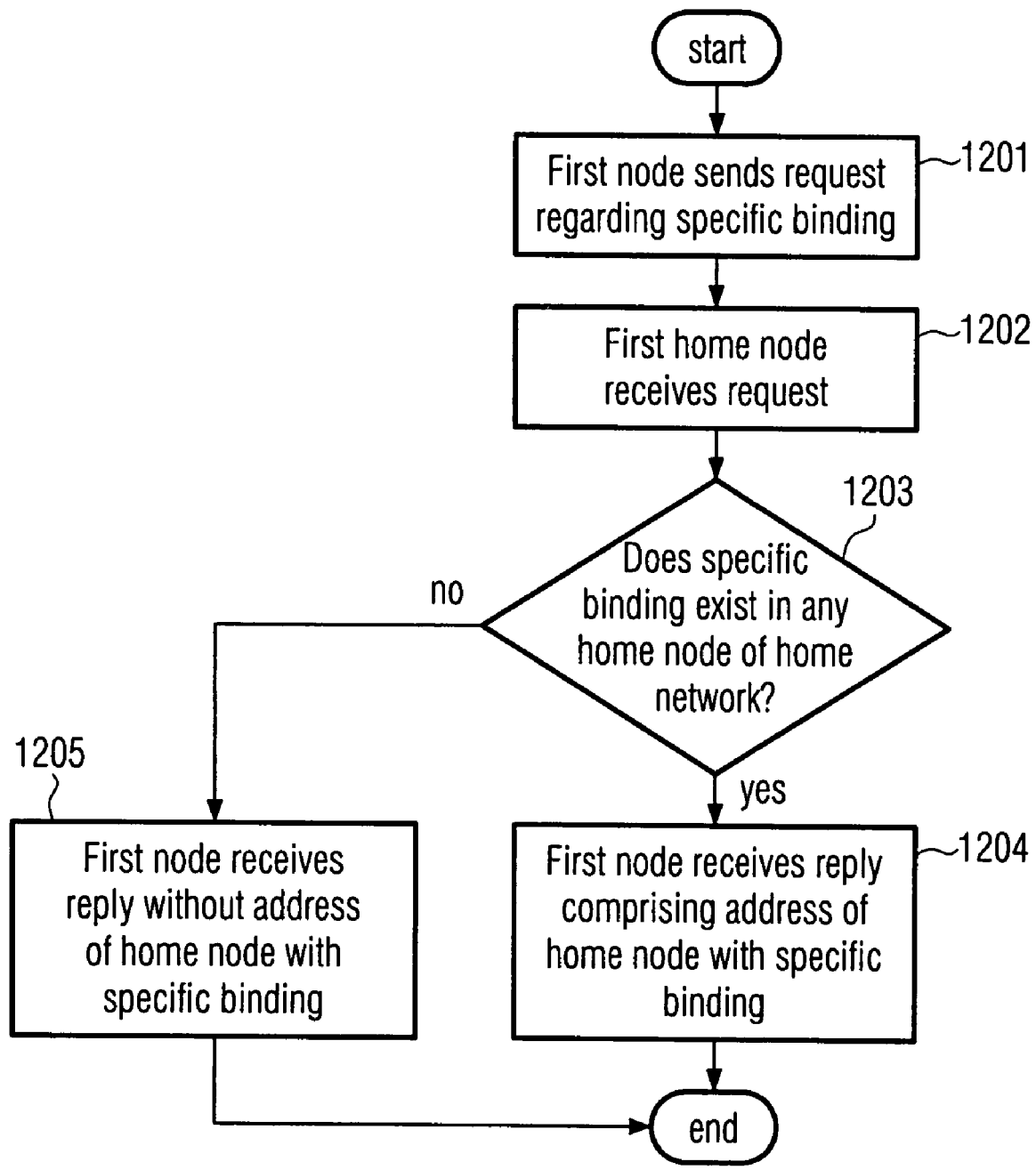
FIG. 12 is a flow diagram depicting the general method.

FIG. 12 depicts the general method as described above. In step 1201 the first node sends a request to a home node to find out if a specific binding exists. The home node receives this request in step 1202. In step 1203 it is determined whether the specific binding exists in any home node of the first node's home network and the first node receives a reply comprising an address of a home node with the specific binding in step 1204, or, if the specific binding does not exist, receives a reply in step 1205 without that information.

A practical problem is that DHAAD messages are ICMP messages without option fields and hence are not extensible, i.e., no new fields can be added without defining a new message type. A solution would be to re-use fields that exist in the DHAAD messages. In comparison to the DHAAD reply message, the DHAAD-SB reply message only requires one or two new flags to be added, indicating the new semantics of the HA list and IP source address field. This can be done by using one or two bits of the reserved field. A more difficult problem is to transmit the HoA of the specific binding in the DHAAD request message without changing the message format, since the reserved field is too small for that purpose.

This invention proposes to utilize the identifier field for this purpose (note that it is possible to additionally or instead use parts of other existing fields such as the reserved field). A new "SB ID flag" indicates the new semantics of the identifier field. In the DHAAD specification, this field contains an arbitrary 16 bit value and is needed by the initiator to permit the mapping of received replies to sent requests.

The basic idea is to compress the 128 bit HoA of the specific binding to a 16 bit value and use this value as identifier. This can be done by, e.g., applying a hash function to the HoA. A hash function is a function for summarizing or probabilistically identifying data. A fundamental property of all hash functions is that if two hashes (according to the same function) are different, then the two inputs were different in some way. This property is a consequence of hash functions being deterministic, mathematical functions, but they are generally not one-to-one, with a large domain and smaller range. Consequently, the equality of two hash values does not guarantee the two inputs were the same, but in some cases, probability theoretic or computability theoretic guarantees apply. Because of the variety of applications for hash functions, they are often tailored to the application. For example, In this case the hash function assumes the existence of an adversary who can deliberately try to find inputs with the same hash value. A hash collision is a situation that occurs when two distinct inputs into a hash function produce identical outputs In order to generate different identifiers when different nodes search for the binding of the same MN, the HoA should be concatenated with the initiator address before applying the hash function, i.e., identifier=hash(HoA|initiator address). It is assumed that all HAs on the home link have the same hash function pre-configured. When receiving the DHAAD message with the "SB ID flag", the HA applies the hash function to each binding cache entry (more specifically to the concatenation of the HoA of the entry and the address of the sender of the DHAAD message). If the resulting hash value is the same as the value in the identifier field, a DHAAD reply message is sent as described above.

However, hash collisions can occur and must be handled. If hash(HoA|x) results in the same hash value as hash(HoA*|x), while HoA is different from HoA*, the reply may contain HA addresses that have a binding cache entry for HoA*, but not for HoA. To solve this problem, two solutions are proposed in the following. In the first solution, all MNs and HAs have an ordered list of different hash functions pre-configured. The initiator repeats the DHAAD-SB procedure using different hash functions, until the joint set of all replies results in a single HA address.

Alternatively, a keyed hash function with different keys can be used instead of different hash functions. The receiver can be informed about the index of the hash function or key to be used by an additional "hash function index field" in the reserved field of the DHAAD request message. The size of this field depends on the number of different hash functions/keys and can be smaller than 8 bit.

In an alternative embodiment, the HA includes the HoA of the binding cache entry that it has found by matching the hash value in the identifier field of the DHAAD reply message. In this way, the initiator can compare the HoA in the binding cache of the HA with the HoA the initiator was looking for, i.e., the HoA that the initiator used to calculate the hash value. Only if both HoAs are equal, the corresponding HA address in the DHAAD reply message is considered a valid result. This solution can be realized by adding the HoA behind the corresponding HA address in the HA list and indicating the new semantics of the list by a new "SB HoA check flag" in the reserved field.

Figure 7:
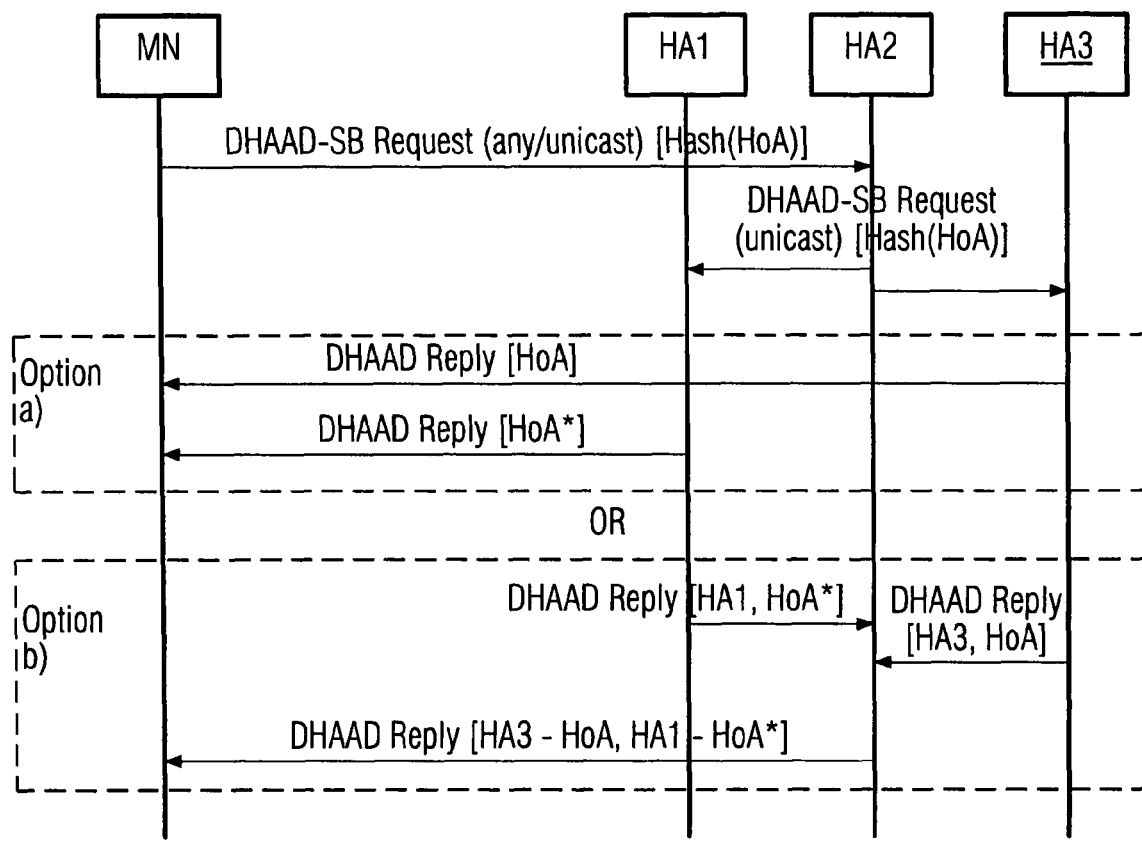
FIG. 7 is an Example of DHAAD-SB signaling flow with hash collision in case of reactive binding cache synchronization.
Figure 8:
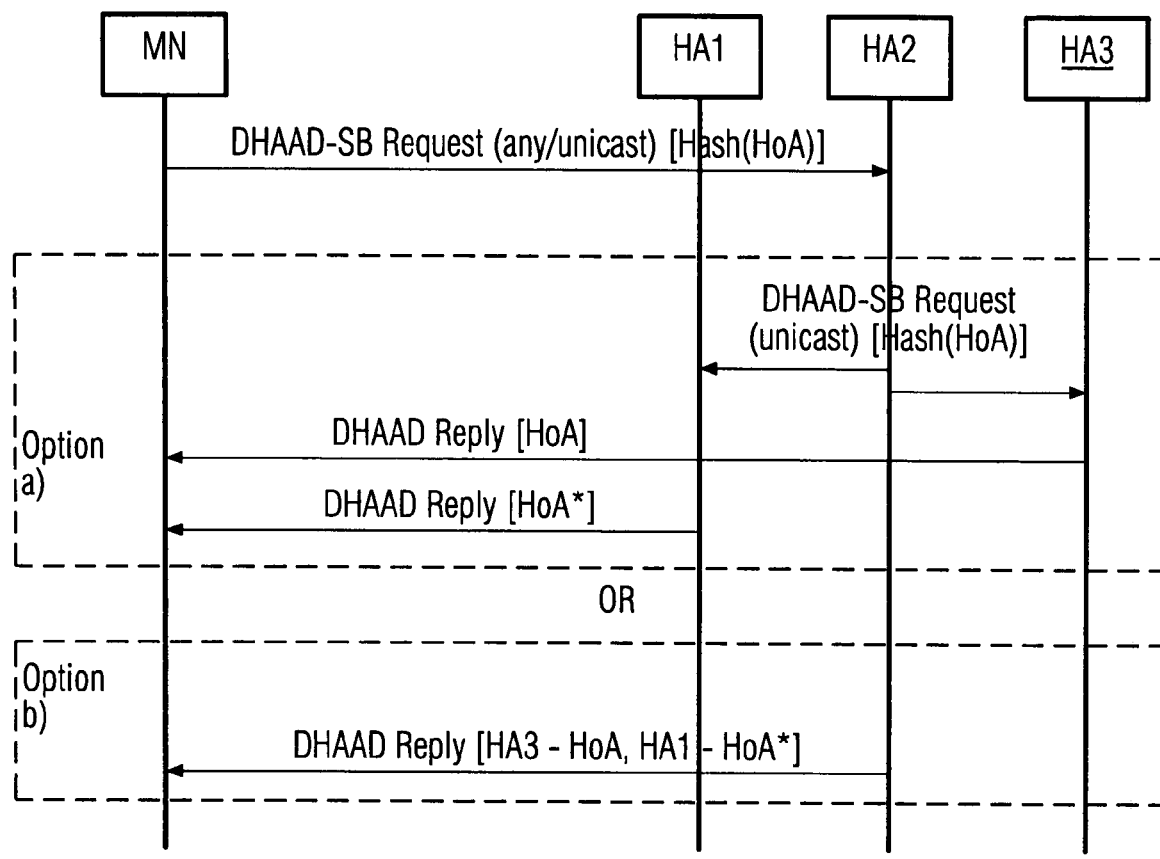
FIG. 8 shows an example of DHAAD-SB signaling flow with hash collision in case of proactive binding cache synchronization.

FIG. 7 and FIG. 8 show exemplary signalling flows when hash collisions occur with reactive and proactive synchronization, respectively.

The solutions described above are not limited to the DHAAD protocol specified in RFC3775. It can analogously be applied to other protocols that are similar.

Furthermore, the entity managing a binding of other nodes does not necessarily need to be an HA, but can also be a Mobility Anchor Point (MAP) or Access Router (AR) instead.

In the following, variants of the solution described above are presented.

Multicast Request Messages

Figure 9:
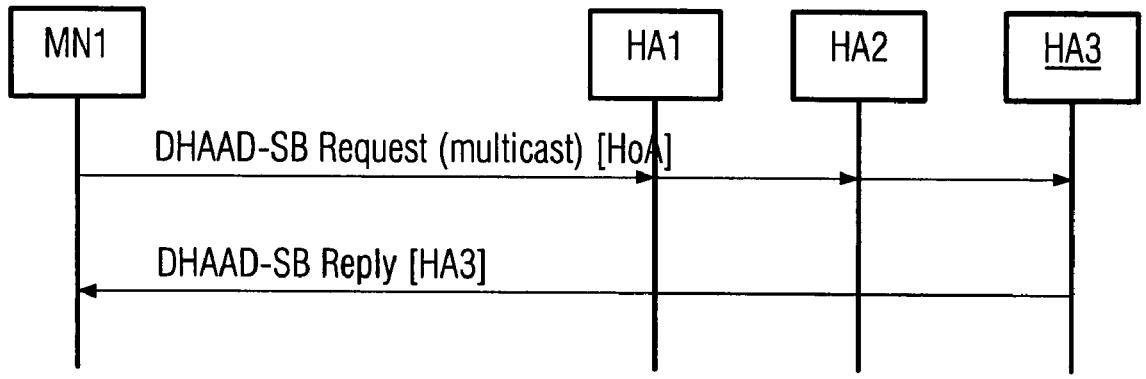
FIG. 9 shows an example of DHAAD-SB signaling flow with multicast request message.

Instead of sending the DHAAD-SB request message to any of the HAs by anycast or by unicast, the request can also be sent to all HAs by multicast. Subsequently, all HAs that find a corresponding entry in their cache reply to the MN. The hash function can be used to transmit the HoA information and the methods described above can be applied to resolve hash collisions. An exemplary signalling flow is shown in FIG. 9. An advantage of this method is the low signalling overhead and the low discovery latency.

Multiple Unicast Request Messages

Figure 10:
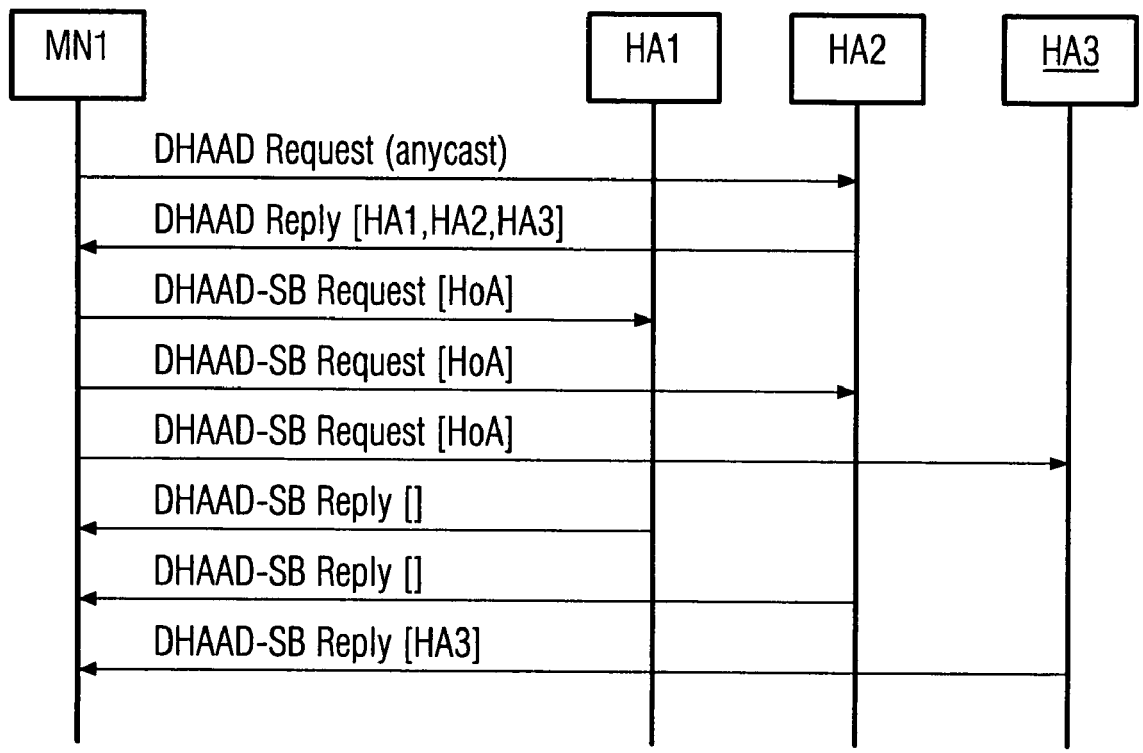
FIG. 10 shows an example of DHAAD-SB signaling flow with multiple unicast request messages.

Alternatively, the initiator can use plain DHAAD or the DNS-based solutions described in the background section to receive a list of all HA addresses and, after that, can send a DHAAD-SB unicast request to every HA, either one after another or concurrently (see FIG. 10).

Well-Known Relationship

Figure 11:
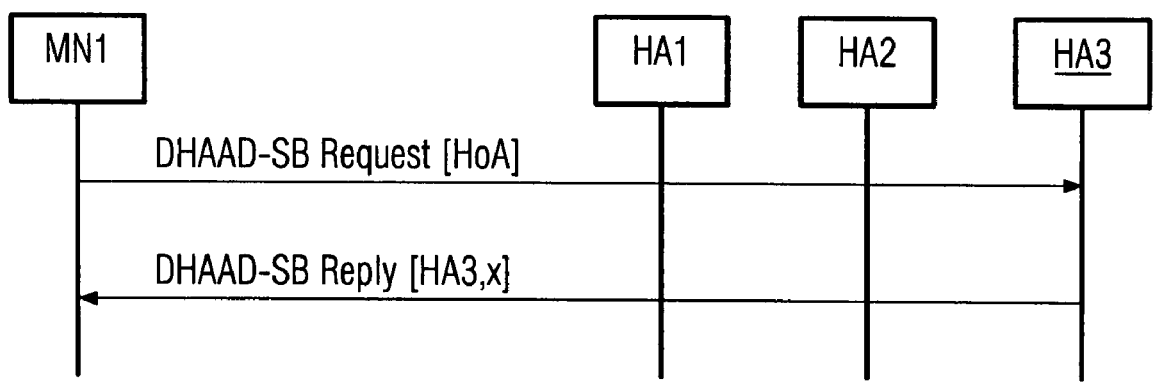
FIG. 11 shows an example of DHAAD-SB signaling flow with a well-known relationship between a HoA and a HA address.

Assuming a well-known relationship between the HoA of a binding and the corresponding HA address, only one the HAs on the link can potentially manage the specific binding. In this case, the MN only has to determine whether this HA has the binding in its binding cache or not. Therefore, it can directly send the request message by unicast to this HA address (see FIG. 11). An example of such a relationship would be "HoA mod x" with x the number of HAs.

Although both the signalling overhead and discovery latency would be minimal, no well-known relationship between the HoA and the HA address exists today.

DNS-Based Solution

Finally, the binding information could be included in the DNS SerVice Record (SRV) resource records. For example, the initiator could send a DNS request and the DNS returns a list of all HAs and their binding caches. Besides security issues, this would result in huge reply messages and thus high signalling overhead.

Another option would be to somehow include the HoA as parameter (e.g., "hoa1.ha1.example.com") and DNS returns the HA address with the specific binding only. However, since the DNS server would have to determine the HA address with the corresponding binding cache entry, this would require changes to DNS server implementations.

This invention may be applicable to other mobility management protocols that make use of servers storing binding or location information for mobile nodes (as a Home Agent in Mobile IP does). The following protocols are examples.

The Session Initiation Protocol (SIP) [J. Rosenberg, H. Schulzrinne et. al., "SIP: Session Initiation Protocol", IETF RFC3261, June 2002] has been developed by the IETF SIP working group and is an application-layer control/signaling protocol for creating, modifying, and terminating communication sessions with correspondent modes. SIP can, e.g., be used for Internet telephony or conferencing. Entities in SIP are user agents, proxy servers, and redirect servers. The SIP user is addressed using an email-like address "user@example.com". To setup a call, SIP messages are exchanged between MN and CN, routed over proxy servers or redirected by the redirect servers. The data packets are exchanged on the direct route between MN and CN. SIP supports mobility through name mapping and redirection ['Mobility Support using SIP', Elin Wedlund and Henning Schulzrinne, Second ACM/IEEE International Conference on Wireless and Mobile Multimedia (WoWMoM'99), Seattle, Wash., August, 1999]. Therefore, a user can register a new location with its proxy or redirect server (or a dedicated location server) to be able to accept new call requests. The new location is also registered at CN to be able to keep receiving data packets of ongoing sessions. Hence, SIP proxy and redirect server can act as location servers.

The IP address traditionally has two roles: it is an identifier and a locator. The Host Identity Protocol (HIP) [R. Moskowitz, P. Nikander, "Host Identity Protocol Architecture", draft-ietf-hip-arch-03, August 2005] is a protocol developed by IETF HIP working group, which provides a method of separating the end-point identifier and locator roles of IP addresses by introducing a new namespace in the network-layer. An HIP node has a Host Identity Tag (HIT) as identifier and an IP address as locator. The HIT is used by upper layers and the IP address for routing. HIP can support mobility [T. Henderson, "End-Host Mobility and Multihoming with the Host Identity Protocol", draft-ietf-hip-mm-02, July 2005] by allowing the MN to register new locators (i.e., new topologically correct IP address after changing subnets) at the CN. [J. Laganier, L. Eggert, "Host Identity Protocol (HIP) Rendezvous Extension", draft-ietf-hip-rvs-04, October 2005] introduces a rendezvous server, which serves as an initial contact point and is able to forward HIP base exchange packets to the current location of MN/CN. Thus, the rendezvous server acts as location server. MOBIKE [P. Eronen, "IKEv2 Mobility and Multihoming Protocol (MOBIKE)", draft-ietf-mobile-protocol-04.txt, October 2005] is another protocol developed by the mobile IETF working group, which adds multi-homing and mobility support to IKEv2. The main scenario for mobile is to keep connectivity with a VPN gateway if the client node is mobile. Therefore, the MN can register a new IP address with the VPN gateway, which again acts as location server.

Another embodiment of the invention relates to the implementation of the various embodiments described above using hardware and software. It is recognized that the various methods mentioned above may be implemented where performed using computing devices (processors), as for example general purpose processors, Digital Signal Processors (DSP), Application Specific Integrated Circuits (ASIC), Field Programmable Gate Arrays (FPGA) or other programmable logic devices, etc. The various embodiments of the invention may also be performed or embodied by a combination of these devices.

Further, the various embodiments of the invention may also be implemented by means of software modules which are executed by a processor or directly in hardware. Also, a combination of software modules and a hardware implementation may be possible. The software modules may be stored in any kind of computer-readable storage medium, for example RAM, EPROM, EEPROM, flash memory, registers, hard disks, CD-ROM, DVD, etc.

The invention claimed is:

1. A method for obtaining a home node address in a packet switched network comprising nodes, the method comprising the steps of:
    a) sending by a first server to a first home node of a home network a request containing information about a home address or a compressed value of the home address of a mobile node, said mobile node being physically distinct from said first server, to determine whether a binding with said home address indicating a registration of said mobile node at the first home node exists;
    b) receiving the request by the first home node, said first home node comprising a stored binding table;
    c) determining whether the binding with said home address exists in any home node of the home network, each of home nodes of the home network including a binding table; and
    d) receiving by the first server a reply comprising the address of the home node with said binding, if the home address of the mobile node is in the binding table of any of the home nodes in the home network,
    wherein, in case the compressed value of the home address is contained in the request, the home address of the mobile node is compressed by applying a hash function and the compressed home address is transported in an identifier field of a Home Agent Address Discovery request message.

2. The method according to claim 1, wherein the registration is a Mobile IP, SIP, HIP, or mobile registration, and
    wherein the first home node is a Mobile IP home agent or a SIP server or a HIP rendezvous server or a MOBIKE server or a mobility anchor point or an access router, and
    wherein the first server is a Mobile IP home agent or a SIP server or a HIP rendezvous server or a MOBIKE server or a mobility anchor point or an access router.

3. The method according to claim 1 wherein step c) comprises searching the binding table of the first home node for the home address of the mobile node.

4. The method according to claim 1, wherein step a) uses an unicast address as destination address.

5. The method according to claim 1 wherein multiple requests are sent to different home nodes using different unicast addresses and multiple replies are sent by different home nodes.

6. The method according to claim 4, wherein said unicast address is determined by a prior request and reply exchange or by a DNS request and reply exchange.

7. The method of claim 4, wherein the unicast address of the first home node is determined by a mapping function between the home address of the mobile node and the first home node address.

8. The method of claim 1, wherein step a) uses an anycast address as destination address; all home nodes being configured with the anycast address, or
    wherein step a) uses a multicast address as destination address; all home nodes being configured with the multicast address.

9. The method according to claim 1 further comprising the steps of:
    e) searching by the first home node in its binding table and in an additional pre-established backup binding table for the home address of the mobile node, with the backup binding table containing bindings stored in other home nodes belonging to the same home network as the first home node; and
    f) sending by the first home node to the first server a reply comprising the address of a second home node with said binding.

10. The method according to claim 1 further comprising the step of
    g) forwarding the first server's request to other home nodes in the home network if the home address of the mobile node has not been found in the binding table of the first home node.

11. The method according to claim 10, wherein step g) uses broadcast, unicast or multicast.

12. The method according to claim 10 further comprising the steps of:
    h) receiving by a second home node the forwarded request;
    i) searching by the second home node in its binding table for the home address of the mobile node; and
    j) sending by the second home node a reply directly to the first server.

13. The method according to claim 10 further comprising the steps of:
    h) receiving by a second home node the forwarded request;
    i) searching by the second home node in its stored binding table for the home address of the mobile node; and
    k) sending by the second home node a reply to the first home node.

14. The method according to claim 13 further comprising the steps of
    l) receiving by the first home node the reply from the second home node; and
    m) sending by the first home node to the first server a reply comprising an indication that said binding exists in the binding table of the second home node.

15. The method according to claim 1, wherein the request and/or reply messages are Mobile IP Home Agent Address Discovery requests and/or reply messages.

16. The method according to claim 15, wherein the address of the home node storing said binding is communicated to the first server by a source address field in an IP header of the Home Agent Address Discovery reply, if the sender of the reply is storing said binding, and a new flag in a reserved field of the Home Agent Address Discovery reply message is added for indication thereof, or wherein the address of the home node storing said binding is communicated to the mobile node by adding it to a binding list in the Home Agent Address Discovery reply message and adding a new flag to a reserved field in the Home Agent Address Discovery reply message for indication thereof.

17. The method according to claim 1, wherein the home address of the mobile node is concatenated with an address of the first server before being compressed to ensure uniqueness of an identifier of each request if the same binding is requested by different nodes.

18. The method according to claim 17, wherein the first home node searches the binding table for said binding by, for each binding table entry, applying the hash function to the home address in the entry or to the concatenation of the home address in the entry and the source address of the request and comparing the resulting hash value with an identifier field in the request.

19. The method according to claim 18, wherein the first server concludes that a hash collision exists if multiple replies indicating different home node addresses or one reply containing multiple different home node addresses are received.

20. The method according to claim 19, wherein the first server and first home node have a pre-configured ordered list of hash functions which are used to compress the home address of the mobile node in subsequent request/reply messages in order to resolve the hash collision, or wherein the hash collision is resolved by including the home address of the binding found in the binding table in the reply message.

21. The method according to claims 19, wherein the hash function is a keyed hash function and the ordered list contains different keys, and wherein a hash function index field or hash key index field in a reserved field of a Home Agent Address Discovery request header indicates a specific hash function or hash key used.

22. A system for obtaining a home node address in a packet switched network comprising nodes, the system comprising:

a first server adapted to send to a first home node of a home network a request containing information about a home address or a compressed value of the home address of a mobile node, said mobile node being physically distinct from said first server, to determine whether a binding with said home address indicating a registration of said mobile node at the first home node exists;

the first home node being adapted to receive the request and comprising a stored binding table;

the first home node further being adapted to search in the binding table for the home address of the mobile node to determine whether said binding exists in any home node of the home network, each of home nodes of the home network including a binding table; and the first server further being adapted to receive a reply comprising the address of the home node with said binding, if the home address of the mobile node is in the binding table of any of the home nodes in the home network, wherein, in case the compressed value of the home address is contained in the request, the home address of the mobile node is compressed by applying a hash function and the compressed home address is transported in an identifier field of a Home Agent Address Discovery request message.

* * * * *